(12) United States Patent
Berquist et al.

(10) Patent No.: US 6,222,691 B1
(45) Date of Patent: Apr. 24, 2001

(54) INTERLEAVED DIBIT DETECTION FOR DIRECT ACCESS STORAGE DEVICE (DASD)

(75) Inventors: Mark Andrew Berquist; Robert Andrew Kertis, both of Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/151,566

(22) Filed: Sep. 11, 1998

(51) Int. Cl.[7] ....................................................... G11B 5/09
(52) U.S. Cl. .............................. 360/46; 360/51; 360/77.02
(58) Field of Search ........................... 360/77.02, 77.08, 360/46, 51; 375/354, 364

(56) References Cited

U.S. PATENT DOCUMENTS 5,321,559 * 6/1994 Nguyen et al. ..................... 360/46
5,608,583 * 3/1997 Shrinkle ............................. 360/46
6,031,672 * 2/2000 Bergquist et al. ................. 360/46

* cited by examiner

Primary Examiner—Alan T. Faber
(74) Attorney, Agent, or Firm—Joan Pennington

(57) ABSTRACT

A method for detecting servo data and an interleaved dibit detection apparatus are provided for servo data detection in a direct access storage device. The interleaved dibit detection apparatus includes a new dibit threshold detector for detecting a predefined threshold level of a new interleave servo signal and providing a new detected dibit output. An old dibit threshold detector detects the predefined threshold level of an old interleave servo signal and provides an old detected dibit output. A combining function coupled to the new dibit threshold detector and the old dibit threshold detector provides a combined detected dibit output.

11 Claims, 10 Drawing Sheets

INTERLEAVED DIBIT DETECTION FOR DIRECT ACCESS STORAGE DEVICE (DASD)

FIELD OF THE INVENTION

The present invention relates to methods and apparatus for detecting data, and more particularly to, an interleaved dibit detection apparatus for servo data detection in a direct access storage device.

DESCRIPTION OF THE RELATED ART

Direct access storage devices (DASDs) often incorporating stacked, commonly rotated rigid magnetic disks are used for storage of data in magnetic form on the disk surfaces. Data is recorded in concentric, radially spaced data information tracks arrayed on the surfaces of the disks. Transducer heads driven in a path toward and away from the drive axis write data to the disks and read data from the disks. Typically servo information is provided on one or more disk surfaces for reading by the transducer heads for accurately and reliably positioning transducer heads on the disk surfaces at a specific location to read and write data.

New high performance DASD drives require higher data and servo rates. As channel speeds go faster, conventional arrangements of circuit functions can be a limiting factor in overall performance. In the design of new DASDs, the performance requirements can be more demanding than the channel can deliver with traditional architectures.

A need exists for an improved dibit detection apparatus for high speed servo data detection in a direct access storage device enabling high speed channel operation.

SUMMARY OF THE INVENTION

A principal object of the present invention is to provide an interleaved dibit detection apparatus for servo data detection in a direct access storage device. Other important objects of the present invention are to provide such interleaved dibit detection apparatus for servo data detection in a direct access storage device substantially without negative effects; and to provide such interleaved dibit detection apparatus that overcome some of the disadvantages of prior art arrangements.

In brief, a method for detecting servo data and an interleaved dibit detection apparatus are provided for servo data detection in a direct access storage device. The interleaved dibit detection apparatus includes a new dibit threshold detector for detecting a predefined threshold level of a new interleave servo signal and providing a new detected dibit output. An old dibit threshold detector detects the predefined threshold level of an old interleave servo signal and provides an old detected dibit output. A combining function coupled to the new dibit threshold detector and the old dibit threshold detector provides a combined detected dibit output.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
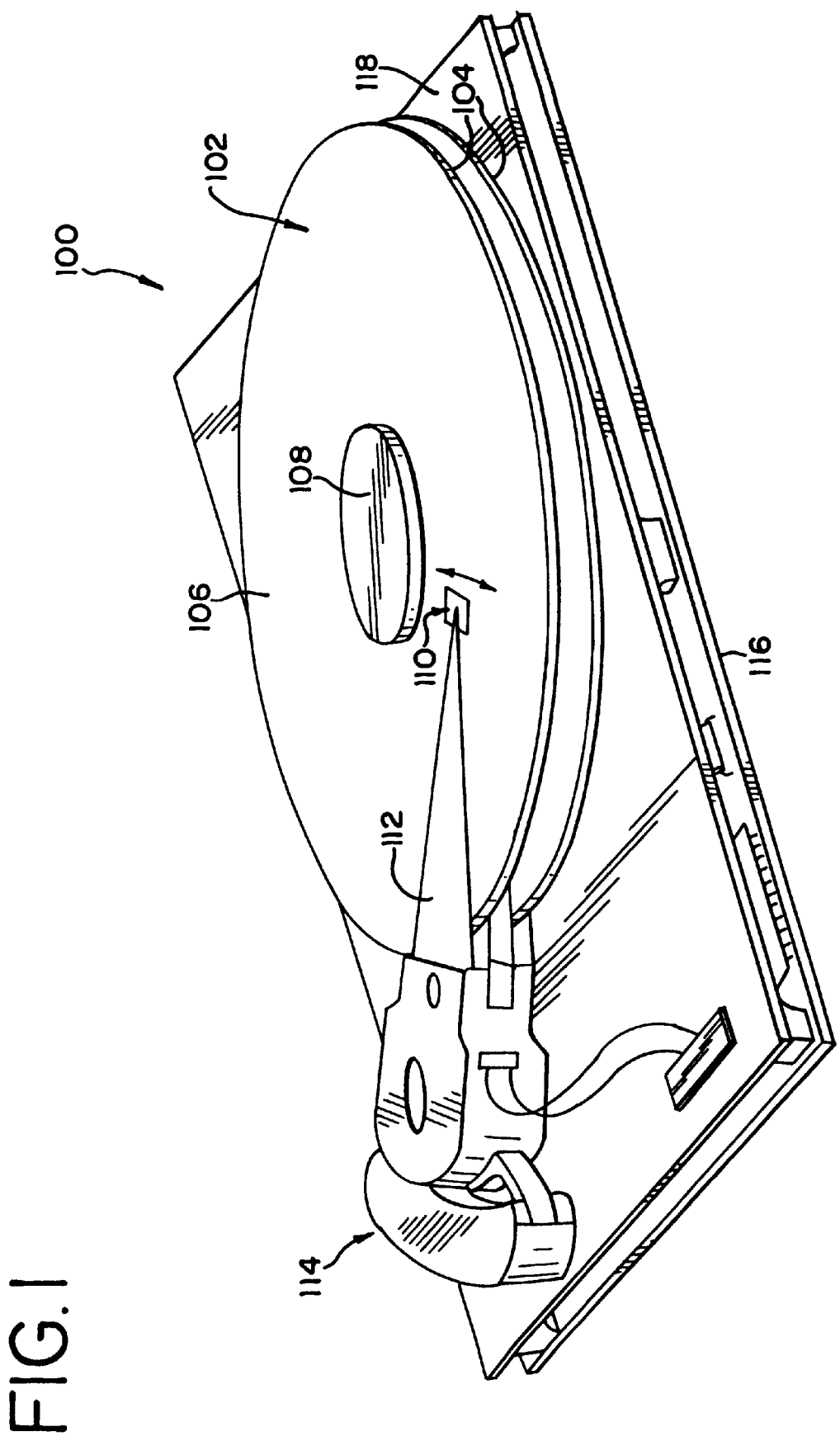
FIG. 1 is a diagrammatic view of a direct access storage device (DASD) embodying the present invention.

Referring now to the drawings, in FIG. 1 there is illustrated a direct access data storage device (DASD) generally designated as 100 including a stack 102 of disks 104 each having at least one magnetic surface 106. The disks 104 are mounted parallel to one another for simultaneous rotation on and by an integrated spindle and motor assembly 108. Information on each magnetic disk surface 106 is read from or written to the disk surface 106 by a corresponding transducer head assembly 110 movable in a path having a radial component across the rotating disk surface 106.

Each transducer head assembly 110 is carried by an arm 112. The arms 112 are ganged together for simultaneous pivotal movement by a voice coil motor (VCM) magnet assembly 114. Drive signals applied to the VCM magnet assembly 114 cause the arms 112 to move in unison to position the transducer head assemblies 110 in registration with information storage tracks on the disk surfaces 106 where information is written or read. As shown in FIG. 1, an electronics card 116 is mounted together with a base support 118 of DASD 100. The utility of the present invention is not restricted to the details of a particular DASD construction.

Figure 2:
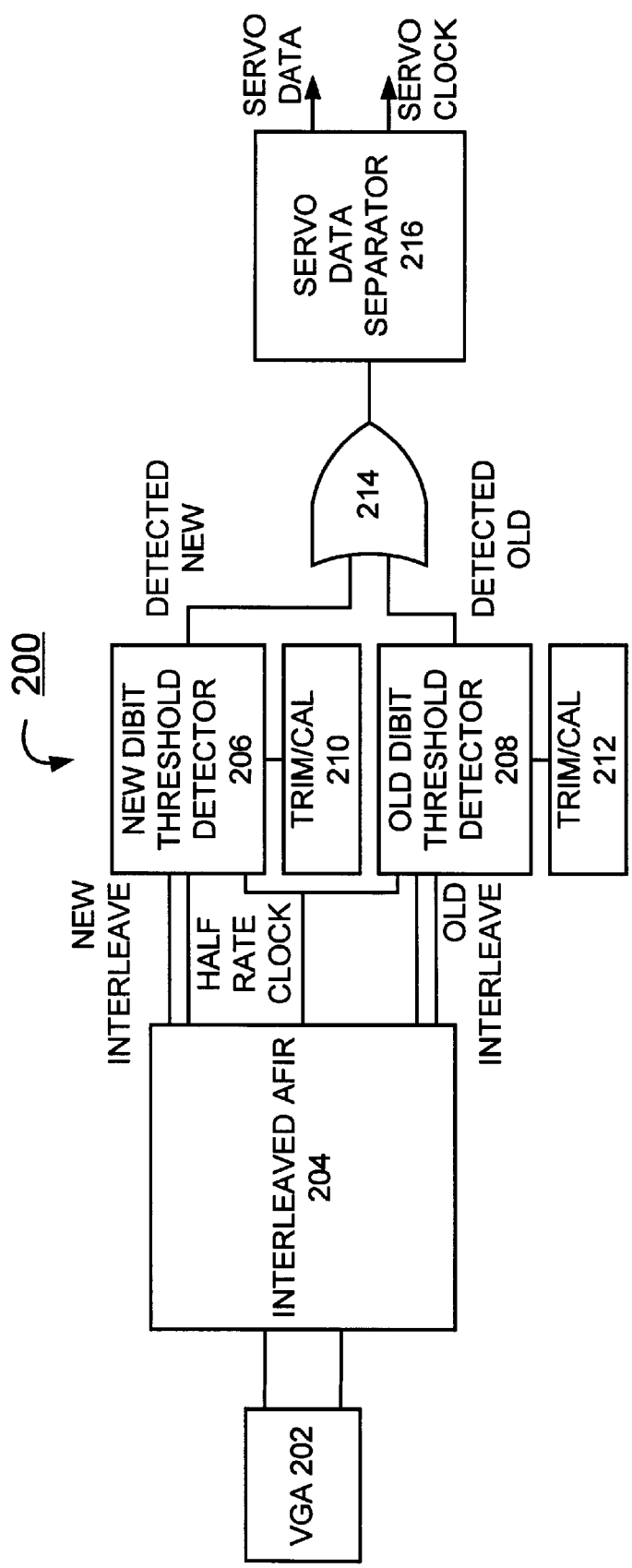
FIG. 2 is a block diagram illustrating an interleaved servo detection apparatus embodying the present invention for servo data detection of the direct access storage device (DASD) of FIG. 1.
Figure 3:
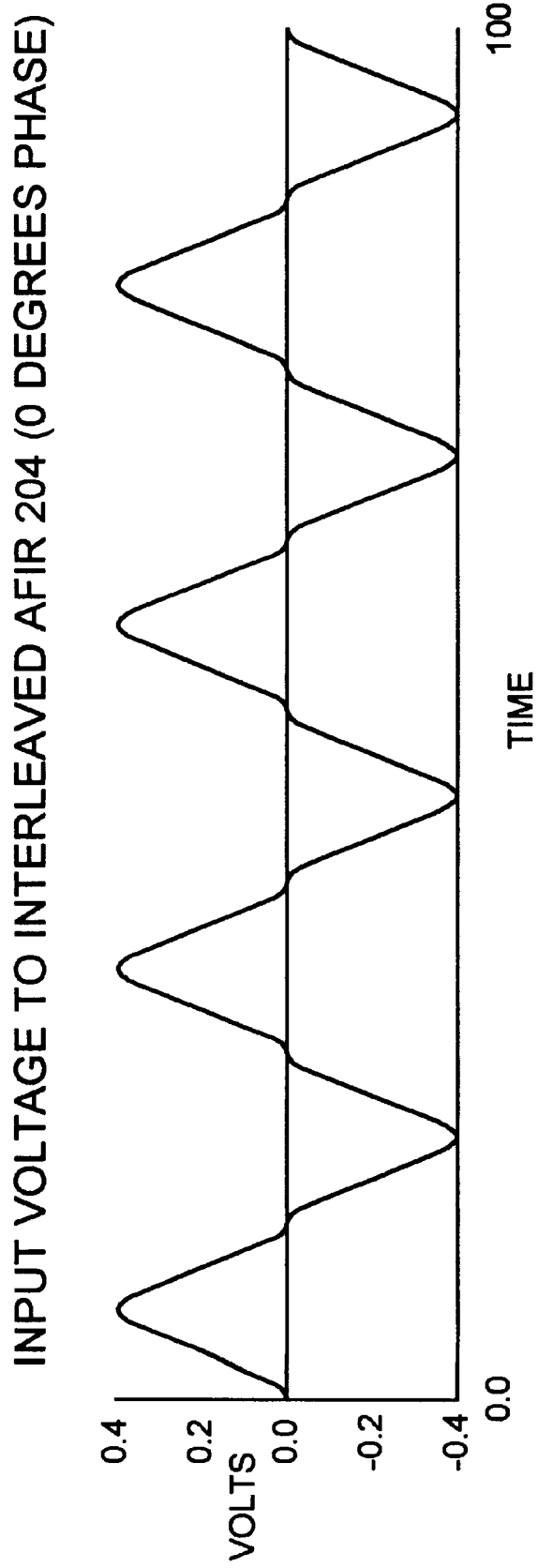
FIG. 3 is a chart illustrating an input voltage to an interleaved analog finite impulse response (AFIR) filter with 0 degrees phase of FIG. 2.
Figure 4:
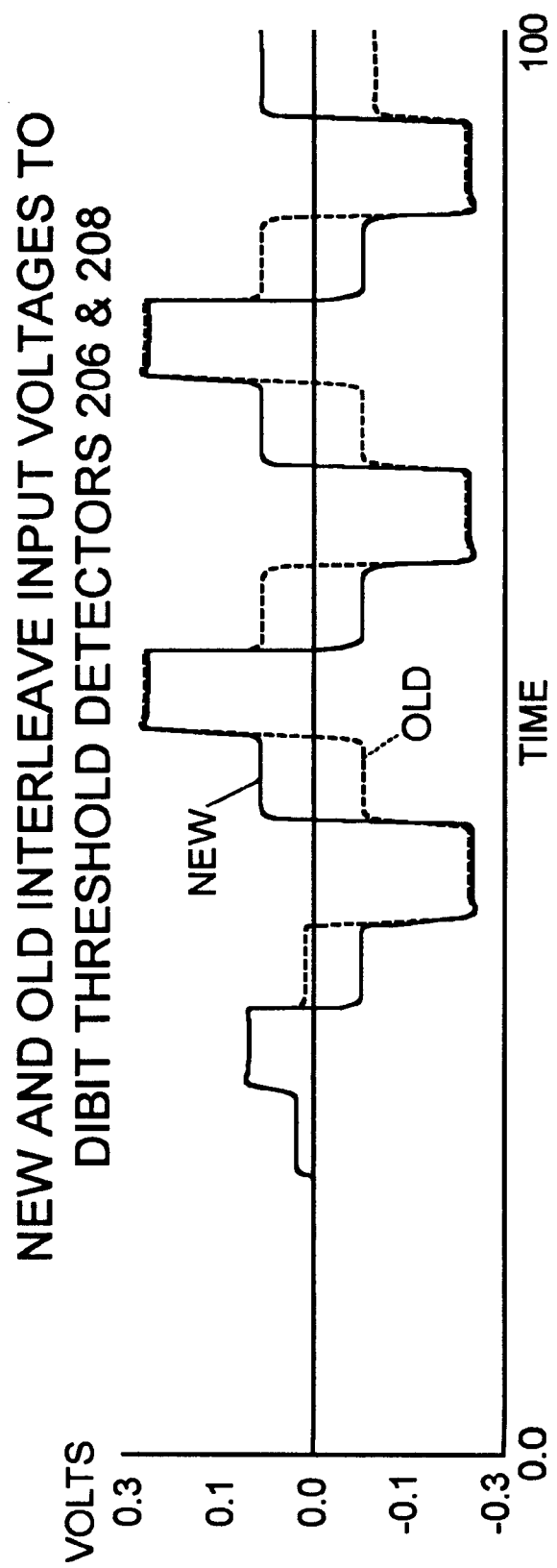
FIG. 4 is a chart illustrating an input voltage to the interleaved dibit threshold detectors of FIG. 2 with the illustrated input voltage of FIG. 3.
Figure 7:
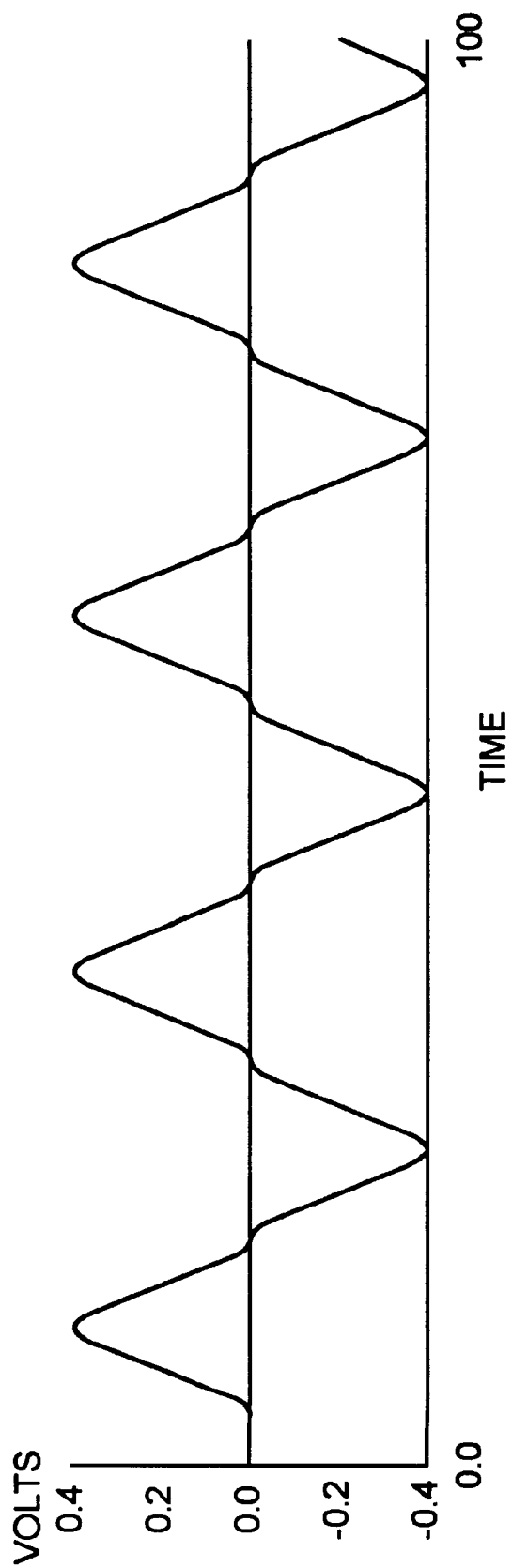
FIG. 7 is a chart illustrating an input voltage to an interleaved analog finite impulse response (AFIR) filter with 45 degrees phase of FIG. 2.
Figure 8:
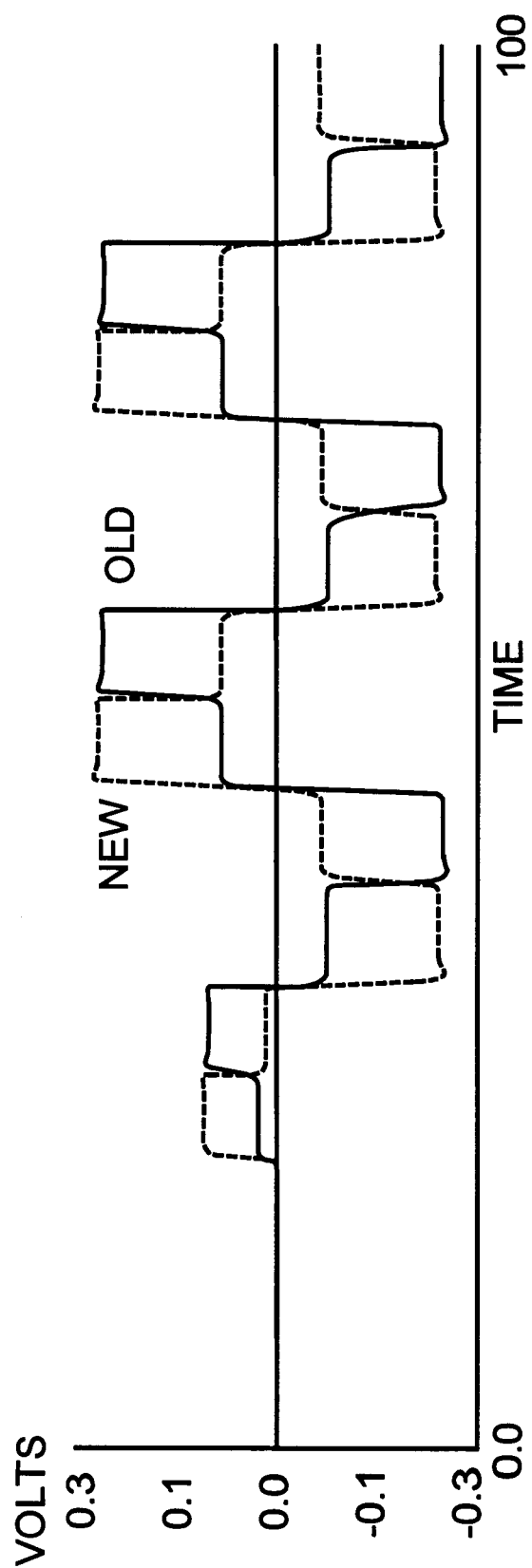
FIG. 8 is a chart illustrating an input voltage to the interleaved dibit threshold detectors of FIG. 2 with the illustrated input voltage of FIG. 7.

FIG. 2 is a block diagram illustrating an interleaved servo detection apparatus generally designated 200 of the invention for servo data detection of the direct access storage device (DASD) 100. The interleaved servo detection apparatus 200 includes a variable gain amplifier (VGA) 202 receiving a differential dibit servo readback signal from the transducer head assembly 110. An amplified, differential signal output of the VGA 202 is coupled to an interleaved, analog finite impulse response (AFIR) filter 204. Examples of the input signal to the interleaved AFIR filter 204 are illustrated in FIGS. 3 and 7. Interleaved AFIR filter 204 provides a new interleave signal to a new interleaved dibit threshold detector 206 and an old interleave signal to an old interleaved dibit threshold detector 208. A half rate clock signal is applied to the new and old interleaved dibit threshold detector 206 and 208. In accordance with features of the invention, in the interleaved dibit detection apparatus 200, each interleaved dibit threshold detector 206 and 208 advantageously operates for example, at one-half bit rate, allowing a very high speed maximum possible data rate. The new interleave signal is the latest AFIR output interleave signal, and the old interleave signal is one full rate clock cycle old. Examples of new and old interleave signals respectively applied to the new dibit threshold detector 206 and the old dibit threshold detector 206 are illustrated in FIGS. 4 and 8.

An improved interleaved analog finite impulse response (AFIR) filter that advantageously can be used for AFIR 204 is disclosed in U.S. patent application entitled INTERLEAVED FINITE INFINITE RESPONSE (FIR) FILTER FUNCTIONS FOR SERVO AND DATA DETECTION IN A DIRECT ACCESS STORAGE DEVICE (DASD), Ser. No. 09/151,433 filed Sep. 11, 1998, by Robert A. Kertis and assigned to the present assignee.

Figure 5:
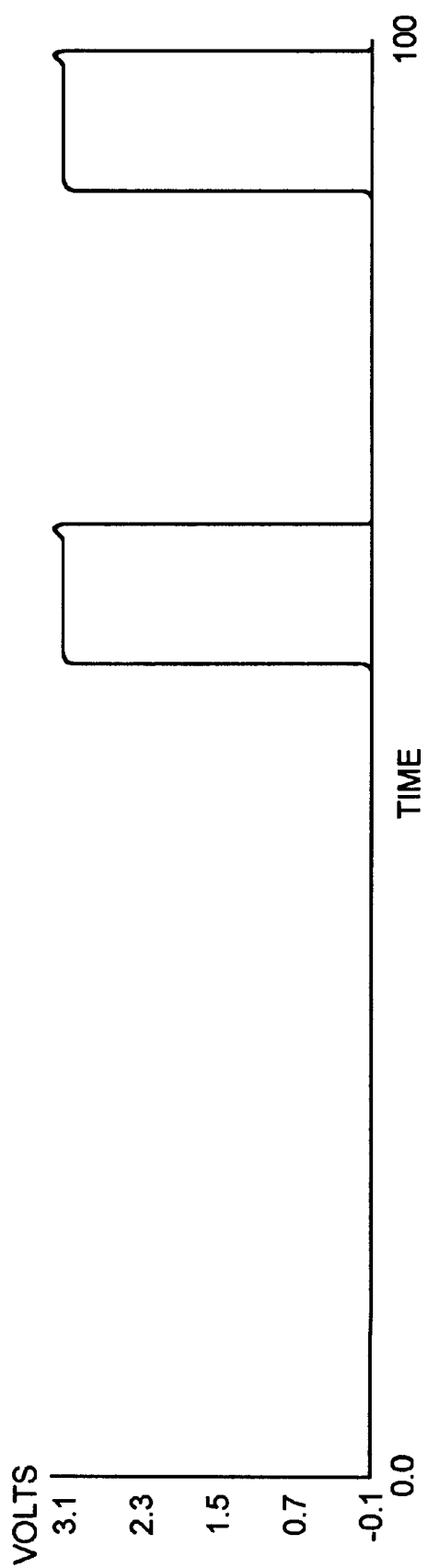
FIG. 5 is a chart illustrating an output of the interleaved dibit threshold detectors of FIG. 2 with the illustrated input voltage of FIG. 3.
Figure 9:
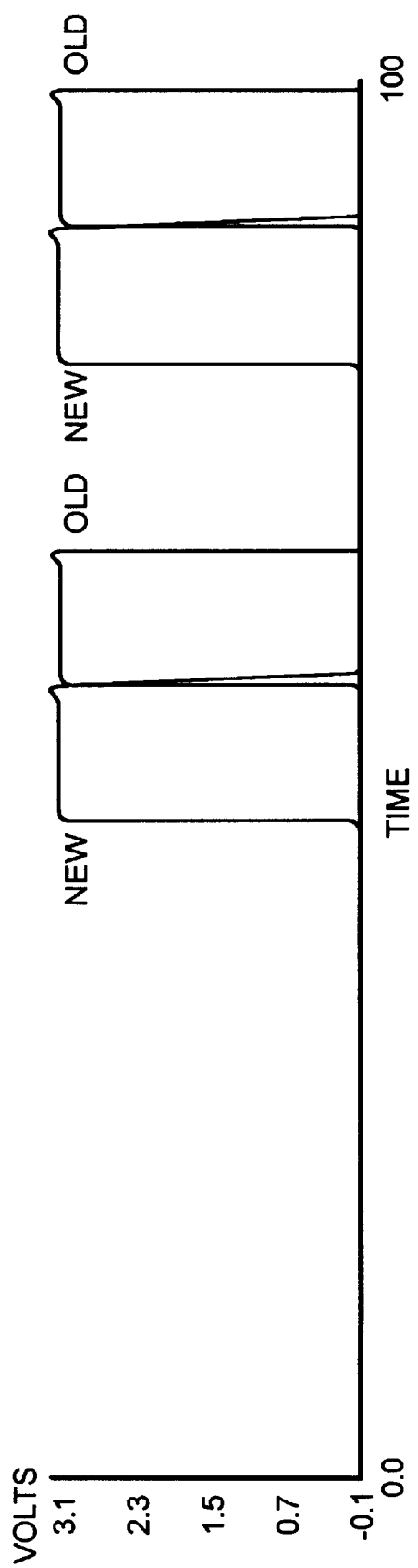
FIG. 9 is a chart illustrating an output of the interleaved dibit threshold detectors of FIG. 2 with the illustrated input voltage of FIG. 7.

The AFIR 204 sequentially generates new and old interleave signals. The new and old interleave signals of the AFIR 204 are two independent signals, one interleave signal shifted in time with respect to the other interleave signal. The new dibit threshold detector 206 and the old dibit threshold detector 208 respectively perform a threshold detection on the applied new and old interleave signals from the AFIR 204. When the predetermined threshold level is crossed in the applied new interleave signal, the new dibit threshold detector 206 provides a high output pulse. When the predetermined threshold level is crossed in the applied old interleave signal, the old dibit threshold detector 208 provides a high output pulse. Example operations of the new and old dibit threshold detectors 206 and 208 are shown in FIGS. 5 and 9 with the new and old interleave signals illustrated in FIGS. 4 and 8 respectively applied by the AFIR 204.

As shown in FIG. 2, each of the interleaved dibit threshold detectors 206 and 208 includes a respective trim/calibrate function 210, 212. However, it should be understood that the trim/calibrate functions 210, 212 can be eliminated when the interleaved paths within the AFIR 204 are substantially matched.

The detected output pulses are clocked out of the new dibit threshold detector 206 and the old dibit threshold detector 208 with the half rate clock to a servo data separator 216 via an OR gate 214. The detected output pulses are combined by the OR gate 214 to produce the same answer as if a non-interleaved architecture was used for the analog FIR filter function. The servo data separator 214 also is clocked by the half rate clock. The servo data separator 214 is a digital logic section where the combined detected output pulses of the interleaved dibit threshold detectors 206 and 208 from the OR gate 214 are used to provide asynchronous detected servo data and a servo clock signal, for example applied to a servo processor (not shown).

Having reference to FIGS. 3–10, operation of the interleaved servo detection apparatus 200 including the interleaved dibit threshold detectors 206 and 208 may be understood. FIGS. 3–6 and 7–10 respectively illustrate operation of the interleaved dibit threshold detectors 206 and 208 depending on the phase that the input waveform is sampled. FIGS. 3–6 illustrate operational signals when sampled on the shoulders or 0 degrees phase. FIGS. 7–10 operational signals when sampled on the peaks or 45 degrees phase.

The BCLK half rate clock of the AFIR 204 is not phase aligned to the input signal applied by the VGA 202. Sampling on the peaks, shoulders, or any phase in between is possible. Operation of the interleaved dibit threshold detectors 206 and 208 is independent of phase. The interleaved dibit threshold detectors 206 and 208 provide correct operation with sampling at any phase.

Figure 6:
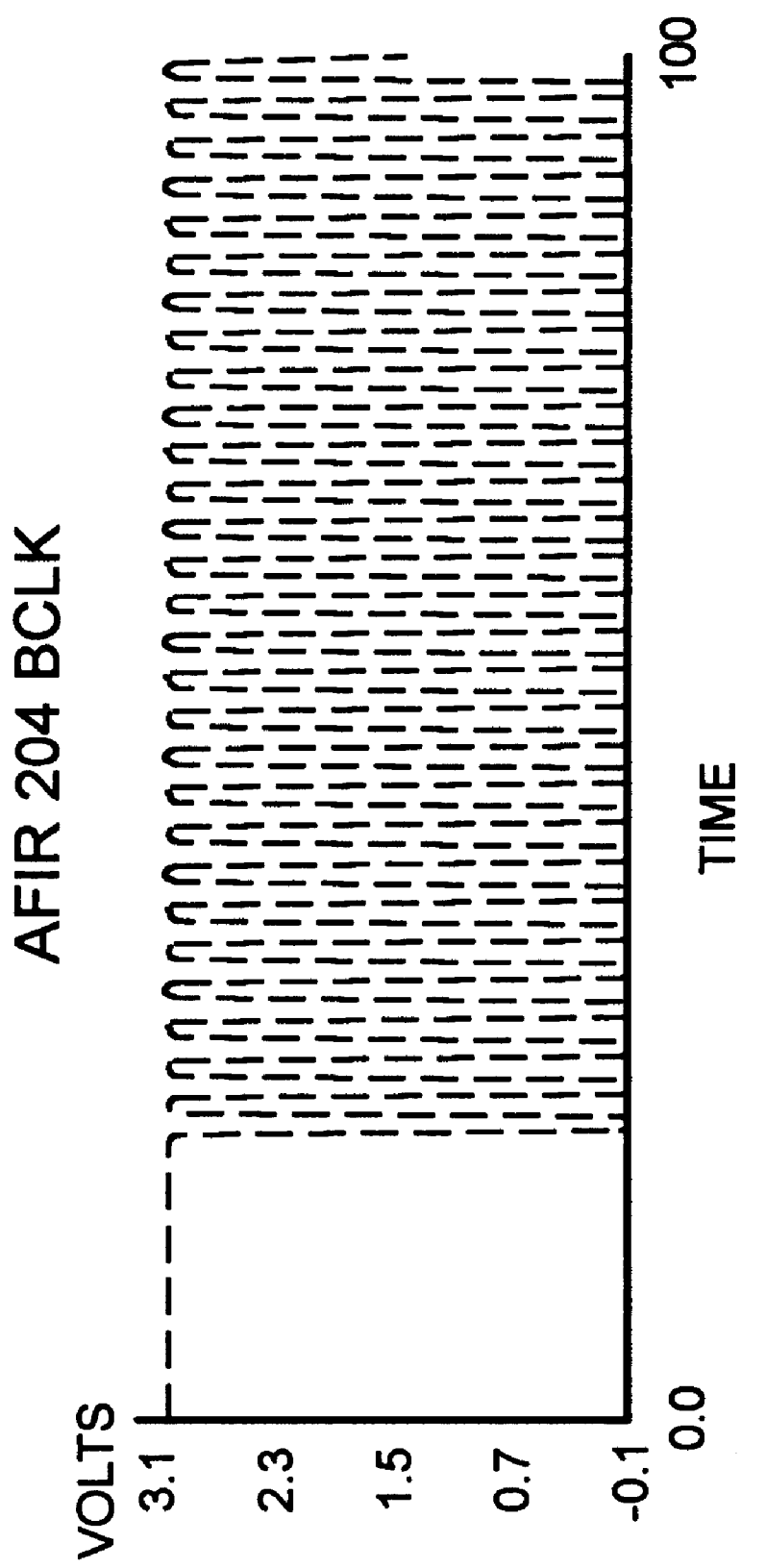
FIG. 6 is a chart illustrating an AFIR BCLK half rate clock signal with the illustrated input voltage of FIG. 3.

FIG. 3 illustrates an input voltage to the interleaved analog finite impulse response (AFIR) filter 204 with 0 degrees phase. FIG. 4 illustrates an input voltage to the interleaved dibit threshold detectors 206, 208 with the input voltage illustrated in FIG. 3 to the interleaved AFIR 204. FIG. 5 illustrates an output of each of the interleaved dibit threshold detectors 206, 208 where the detected threshold outputs overlap. FIG. 6 illustrates a BCLK half rate clock signal of AFIR 204 which is the half rate clock applied to the interleaved dibit threshold detectors 206, 208 and the servo data separator 216.

Figure 10:
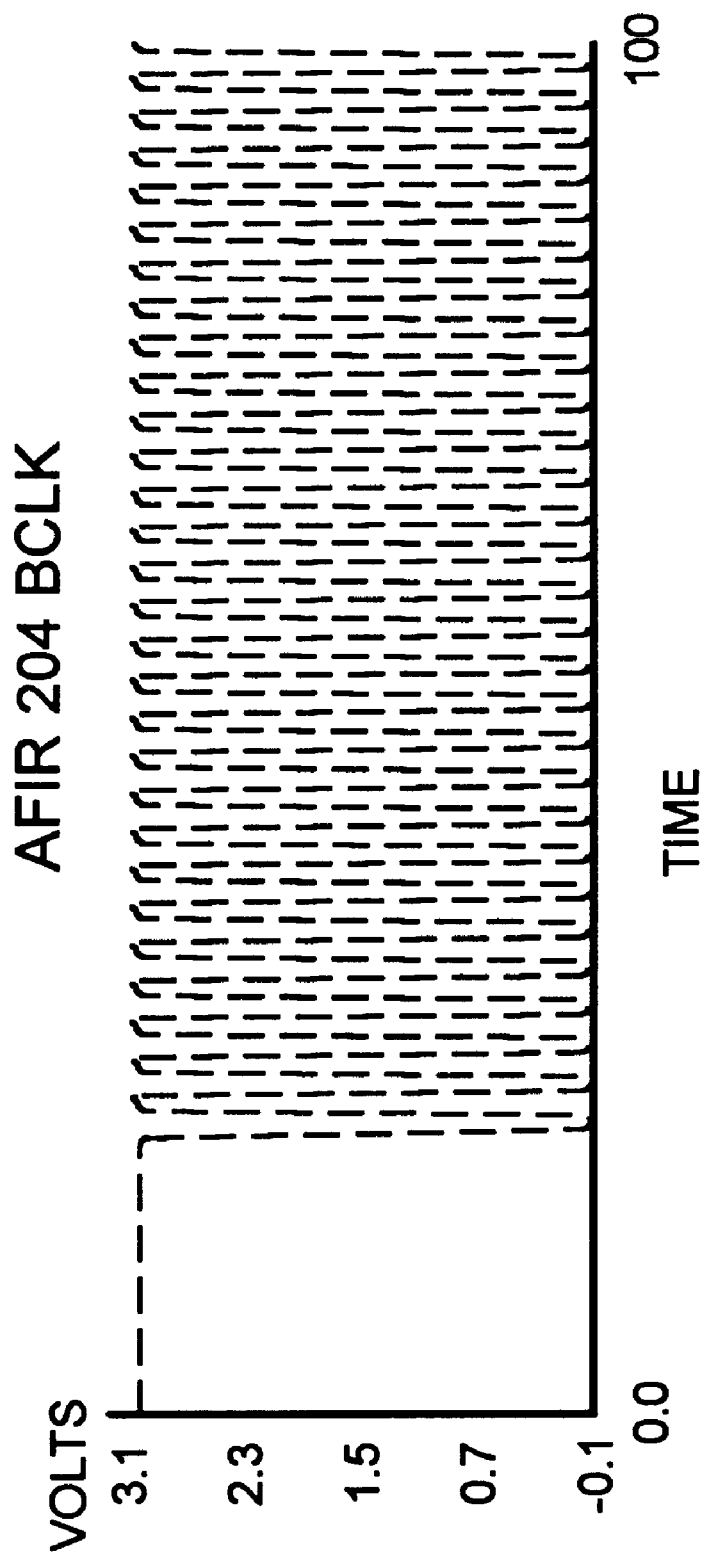
FIG. 10 is a chart illustrating an AFIR BCLK half rate clock signal with the illustrated input voltage of FIG. 7.

FIG. 7 illustrates the input voltage to the interleaved AFIR filter 204 with 45 degrees phase. FIG. 8 illustrates the resulting input voltage to the interleaved dibit threshold detectors 206 and 208. FIG. 9 illustrates the resulting output of the respective interleaved dibit threshold detectors 206 and 208. FIG. 10 illustrates the AFIR BCLK half rate clock signal.

While an analog FIR 204 is shown in FIG. 2, it should be understood that the interleaved dibit threshold detectors 206 and 208 can be used with a digital FIR filter to identify digital threshold values in accordance with the invention.

While the present invention has been described with reference to the details of the embodiments of the invention shown in the drawing, these details are not intended to limit the scope of the invention as claimed in the appended claims.

What is claimed is:

1. An interleaved dibit detection apparatus for servo data detection in a direct access storage device comprising:

a new dibit threshold detector and an old dibit interleaved dibit threshold detector receiving a half rate clock signal;

said new dibit threshold detector for detecting a predefined threshold level of a new interleave servo signal and providing a new detected dibit output;

said old dibit threshold detector for detecting said predefined threshold level of an old interleave servo signal and providing an old detected dibit output; said new interleave servo signal being a latest interleave signal and said old interleave servo signal being one full rate clock cycle earlier than said new interleave servo signal; and a combining function coupled to said new dibit threshold detector and said old dibit threshold detector for providing a combined dibit output.

2. The interleaved dibit detection apparatus as recited in claim 1 further includes an analog finite impulse response (AFIR) filter providing said new and said old interleave servo signals.

3. The interleaved dibit detection apparatus as recited in claim 1 wherein said new dibit threshold detector and said old dibit threshold detector are digital detectors.

4. The interleaved dibit detection apparatus as recited in claim 1 wherein said combining function coupled to said new dibit threshold detector and said old dibit threshold detector for providing said combined dibit output provides a detected dibit output responsive to said new detected dibit output or said old detected dibit output; said detected dibit output used to provide asynchronous detected servo data and a servo clock signal.

5. The interleaved dibit detection apparatus as recited in claim 1 wherein said combining function includes an OR gate connected to said new detected dibit output and said old detected dibit output.

6. The interleaved dibit detection apparatus as recited in claim 1 further includes a data separator coupled to said combining function for providing servo data responsive to said combined dibit output.

7. The interleaved dibit detection apparatus as recited in claim 6 wherein said data separator further provides a servo clock signal.

8. A method for detecting servo data in a direct access storage device comprising the steps of:

providing a new interleave servo signal and an old interleave servo signal, utilizing an interleaved analog finite impulse response filter function; said new interleave servo signal being a latest interleave signal and said old interleave servo signal being one full rate clock cycle earlier than said new interleave servo signal;

detecting a predefined threshold level of said new interleave servo signal and providing a new detected dibit output, utilizing a new dibit threshold detector receiving a half rate clock signal;

detecting a predefined threshold level of said old interleave servo signal and providing an old detected dibit output, utilizing an old dibit threshold detector receiving said half rate clock signal; and combining said new detected dibit output and said old detected dibit output to provide a combined detected dibit output.

9. The method for detecting servo data in a direct access storage device as recited in claim 8 further includes the step of applying said combined detected dibit output to a data separator for providing servo data responsive to said combined detected dibit output.

10. The method for detecting servo data in a direct access storage device as recited in claim 8 wherein the step of combining said new detected dibit output and said old detected dibit output to provide said combined detected dibit output includes the step of applying said new detected dibit output and said old detected dibit output to an OR gate.

11. The method for detecting servo data in a direct access storage device as recited in claim 8 wherein said step of providing said new interleave servo signal and said old interleave servo signal, utilizing said interleaved analog finite impulse response filter function includes the step of providing independent new and old interleave servo signals.

* * * * *